United States Patent [19]

Hiraoka et al.

[11] Patent Number: 5,684,065
[45] Date of Patent: Nov. 4, 1997

[54] SURFACE-MODIFIED FLUORINE-CONTAINING RESIN MOLDED ARTICLE

[75] Inventors: Hiroyuki Hiraoka, Kowloon, Hong Kong; Shinji Tamaru; Osamu Tanaka, both of Settsu, Japan

[73] Assignee: Daikin Industries, Ltd., Osaka, Japan

[21] Appl. No.: 750,865

[22] PCT Filed: Jun. 26, 1995

[86] PCT No.: PCT/JP95/01276

§ 371 Date: Dec. 19, 1996

§ 102(e) Date: Dec. 19, 1996

[87] PCT Pub. No.: WO96/01287

PCT Pub. Date: Jan. 18, 1996

[30] Foreign Application Priority Data

Jul. 1, 1994 [JP] Japan ................. 6-173542

[51] Int. Cl.$^6$ ................. C08J 3/28
[52] U.S. Cl. ................. 523/300; 522/2; 522/31; 522/63; 522/64; 522/65; 522/75; 522/76; 522/78
[58] Field of Search ................. 523/300; 522/2, 522/31, 32, 63, 64, 65, 75, 76, 78

[56] References Cited

U.S. PATENT DOCUMENTS

| | | | |
|---|---|---|---|
| 4,052,278 | 10/1977 | Brown et al. | 204/159.2 |
| 5,240,973 | 8/1993 | Katoh et al. | 522/73 |
| 5,500,459 | 3/1996 | Hagemeyer et al. | 523/300 |

FOREIGN PATENT DOCUMENTS

| | | |
|---|---|---|
| 60-226534 | 11/1985 | Japan. |
| 2-196834 | 3/1990 | Japan. |
| 3-57143 | 8/1991 | Japan. |
| 5-222223 | 8/1993 | Japan. |
| 7-118421 | 9/1995 | Japan. |

OTHER PUBLICATIONS

Niino, Yabe et al., "*Contributions II to the 65th Spring Meeting of Japan Chemical Society,*" (1993), p. 252.

*Primary Examiner*—Edward J. Cain
*Attorney, Agent, or Firm*—Burns, Doane, Swecker & Mathis, LLP

[57] ABSTRACT

To provide a fluorine-containing resin molded article surface-modified by irradiating, onto a surface thereof, a laser beam having a wavelength of 150 to 370 nm through a basic solution, preferably an aqueous basic solution. The surface-modified fluorine-containing resin molded article is excellent in adhesion to not only organic materials but also metals.

5 Claims, 2 Drawing Sheets

SURFACE-MODIFIED FLUORINE-CONTAINING RESIN MOLDED ARTICLE

TECHNICAL FIELD

The present invention relates to techniques for surface modification of a fluorine-containing resin molded article by irradiation of a laser beam to enhance its adhesion, printing properties and affinity with other compounds.

BACKGROUND ART

A fluorine-containing resin is excellent in heat resistance, chemical resistance, weather resistance and the like, and is used widely in the medical, electronic and chemical fields, field of precision instrument, etc.

Since the fluorine-containing resin, however, has water- and oil-repelling property and small surface activating energy, the fluorine-containing resin has very poor adhesion, difficulty of production of a composite material and inferior printing properties.

Therefore various techniques for modifying a surface of a fluorine-containing resin molded article have been studied, and there have been proposed chemical etching treatment by means of a liquid ammonia/sodium solution or a sodium/naphthalene complex; corona discharge treatment; plasma discharge treatment; and the like.

Further, surface modification by pulse-irradiation of an excimer laser beam having a wavelength ranging from 95 to 200 nm was proposed (JP-B-57143/1991). However, that method is such that a fluorine-containing resin molded article is pulse-irradiated in the air with the excimer laser beam having a wavelength ranging from 95 to 200 nm, and thus, its adhesion to an adhesive, printing ink, paint or the like is improved, but is not sufficient. Also though it is known that nearly the similar improvement in adhesion is obtained by irradiating a laser beam in an atmosphere of inorganic compound such as hydrazine gas (Niino, Yabe et al., "Contributions II to The 65th Spring Meeting of Japan Chemical Society" (1993), p252), when such a gas is used, a vacuum vessel is required, which makes a cost of an equipment high. In addition, hydrazine has toxicity and explosiveness and there is a problem with its handling.

In addition to the above-mentioned methods, there is known a method for surface-modifying an acrylic resin by irradiating a laser beam in an atmosphere of gaseous or liquid nitrogen-containing compound (JP-A-222223/1993). However, that patent publication does not indicate any concept of making the atmosphere basic in the surface modification of a fluorine-containing resin molded article, and says that the atmosphere used is preferably in gaseous form rather than in liquid form.

It is an object of the present invention to solve the above-mentioned problems of conventional methods and to provide a surface-modified fluorine-containing resin molded article which has enhanced adhesion not only to organic materials such as an adhesive, printing ink and paint but also to metals.

DISCLOSURE OF THE INVENTION

The present invention relates to a surface-modified fluorine-containing resin molded article obtained by irradiating its surface with a laser beam having a wavelength of 150 to 370 nm through a basic solution.

It is preferable that the above-mentioned basic solution is an aqueous basic solution.

It is preferable that a pKb of the above-mentioned aqueous basic solution is not more than 5.

It is preferable that the pKb of the above-mentioned aqueous basic solution is from 4 to 0.1.

It is preferable that the above-mentioned aqueous basic solution is an aqueous solution of a quaternary phosphonium compound or quaternary ammonium compound represented by the formula:

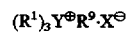

wherein $R^1$ is an alkyl group having 1 to 20 carbon atoms, $R^9$ is an alkyl group having 1 to 20 carbon atoms or an aralkyl group having 7 to 20 carbon atoms, X is an anion such as halide, hydroxylate, alkoxylate, carboxylate, phenoxide, sulfonate, sulfate, sulfite or carbonate, Y is nitrogen atom or phosphorus atom; a quaternary ammonium compound represented by the formula:

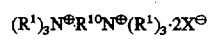

wherein $R^1$ and X are the same as above, $R^{10}$ is an alkylene group having 1 to 21 carbon atoms or a phenylenedialkylene group having 8 to 12 carbon atoms; or a quaternary ammonium compound represented by the formula:

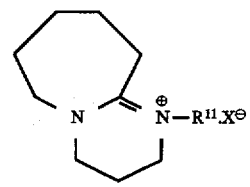

wherein X is the same as above, $R^{11}$ is an alkyl group having 1 to 24 carbon atoms or an aralkyl group having 7 to 20 carbon atoms.

BEST MODE FOR CARRYING OUT THE INVENTION

Figure 1:
FIG. 1 is an electron microscopic photograph (×5,000) showing a state of a surface of a PTFE sheet before irradiation of a laser beam in Example 1.

As a fluorine-containing resin molded article to be surface-modified in the present invention, there are exemplified molded articles of polytetrafluoroethylene (PTFE), polyvinylidene fluoride (PVdF), tetrafluoroethylene-perfluoro(alkyl vinyl ether) copolymer (PFA), ethylene-tetrafluoroethylene copolymer (ETFE), ethylene-chlorotrifluoroethylene copolymer (ECTFE) and the like. Those polymers may contain a heat resistive resin, for example, polyamide imide (PAI), polyimide (PI), polyphenylene sulfide (PPS), polyethylene sulfide (PES) or the like in an amount of not more than about 50% by weight. Also to those polymers may be added a known additive or processing aid such as filler, plasticizer, stabilizer, lubricant, extender, pigment, dye, heat resistance improver, flame retarder, anti-oxidant, weather resistive agent, light absorber, surfactant, cross-linking agent, anti-fogging agent, moisture-proof agent and elasticity improver.

A shape of the molded article is not limited particularly, and various shapes such as film, tape, sheet, plate, rod and fiber can be treated. A method of molding also is not limited particularly. There can be employed known molding methods such as melt-extrusion method, casting method, compression method and calendering method.

According to the present invention, such a fluorine-containing resin molded article is irradiated with a laser beam through a basic solution.

A wavelength range of the laser beam to be irradiated is from 150 to 370 nm, preferably from 193 to 308 nm. A laser beam having a wavelength exceeding 370 nm has an effect of only causing optical deterioration and thermal deterioration of the synthetic resin molded article. Also a laser beam having a wavelength less than 150 nm is not known as a light source usable for industrial use. As lasers irradiating a laser beam having the above-mentioned wavelength range, there are for example, an excimer laser (ArF(193 nm), KrCl(222 nm), KrF(249 nm), XeCl(308 nm) or XeF(350 nm)), a gas laser (Ar(351.1 nm), (363.8 nm), Kr(350.7 nm), (356.4 nm) or $N_2$(337.1 nm)), an Nd-YAG laser (wavelength converted to ¼(266 nm)), a semiconductor laser (ZnS(about 340 nm)), a dye laser (cumulene) and the like. From a point of easy handling for industrial use and from safety point of view, a solid laser is preferable, and particularly, easily available YAG laser which has a wavelength converted to ¼ or ⅓ is preferable.

Irradiation of a laser beam may be pulse-irradiation or continuous irradiation. Irradiation conditions vary depending on lasers. In case of pulse irradiation, an energy per 1 pulse is from 1 to 1,000 mJ, and the number of pulses is from 100 to 50,000 pulses, and in case of continuous irradiation, an output of a laser is from 10 mW to 10 W. The total irradiation energy thereof is conditioned on 50 $J/cm^2$ to 500 $J/cm^2$.

An important feature of the present invention is to carry out irradiation of the laser beam through a basic solution, preferably an aqueous solution thereof but not in the air. As the basic solution, there is, for example, an aqueous solution of an inorganic basic compound such as $NH_4OH$ or a solution of an organic basic compound.

As the organic basic compound, there is, for example, an organic phosphorus compound or organic amine compound represented by the formula (I):

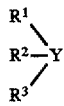
(I)

wherein Y is nitrogen atom or phosphorus atom, $R^1$, $R^2$ and $R^3$ are the same or different and are hydrogen atom or an alkyl group having 1 to 20 carbon atoms, each may be a cycloalkyl group, two of $R^1$, $R^2$ and $R^3$ may be bonded to form a ring (when the ring is formed, Y in the above-mentioned formula is nitrogen atom), or an organic amine compound represented by the formula (II):

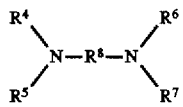
(II)

wherein $R^4$, $R^5$, $R^6$ and $R^7$ are the same or different and each is hydrogen atom or an alkyl group having 1 to 6 carbon atoms, two of $R^4$ and $R^6$ and/or of $R^5$ and $R^7$ may be bonded to form a ring, $R^8$ is an alkylene group having 1 to 21 carbon atoms.

Also there may be used inorganic or organic acid salts thereof (in case of those organic or inorganic acid salts, Y in the above-mentioned formula is nitrogen atom).

Further, there is a quaternary phosphonium compound or quaternary ammonium compound represented by the formula (III):

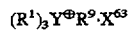
(III)

wherein Y and $R^1$ are the same as above, $R^9$ is an alkyl group having 1 to 20 carbon atoms or an aralkyl group having 7 to 20 carbon atoms, X is an anion such as halide, hydroxylate, alkoxylate, carboxylate, phenoxide, sulfonate, sulfate, sulfite or carbonate; a quaternary ammonium compound represented by the formula (IV):

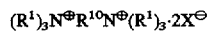
(IV)

wherein $R^1$ and X are the same as above, $R^{10}$ is an alkylene group having 1 to 21 carbon atoms or a phenylenedialkylene group having 8 to 12 carbon atoms; a quaternary ammonium compound represented by the formula (V):

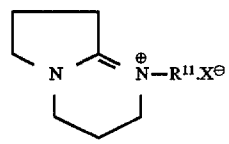
(V)

wherein X is the same as above, $R^{11}$ is an alkyl group having 1 to 24 carbon atoms or an aralkyl group having 7 to 20 carbon atoms; a quaternary ammonium compound represented by the formula (VI):

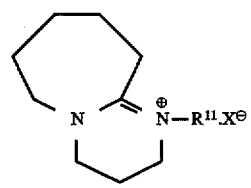
(VI)

wherein $R^{11}$ and X are the same as above; a quaternary ammonium compound represented by the formula (VII):

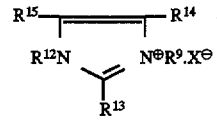
(VII)

wherein $R^9$ and X are the same as above, $R^{12}$ is an alkyl or cycloalkyl group having 1 to 20 carbon atoms or an aralkyl group having 7 to 20 carbon atoms, $R^{13}$ is hydrogen atom, an alkyl or cycloalkyl group having 1 to 12 carbon atoms, an aryl group having 6 to 12 carbon atoms, an aralkyl group having 7 to 15 carbon atoms, an ether residue having 1 to 12 carbon atoms, hydroxyl, carbonyl, an alkoxycarbonyl group, an acyl group or a heterocyclic group having at least nitrogen atom and/or sulfur atom, $R^{14}$ and $R^{15}$ are the same or different and each is hydrogen atom or a lower alkyl group having 1 to 4 carbon atoms; a quaternary ammonium compound represented by the formula (VIII):

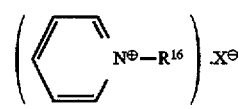
(VIII)

wherein X is the same as above, $R^{16}$ is an alkyl group having 1 to 20 carbon atoms; or a quaternary ammonium compound represented by the formula (IX):

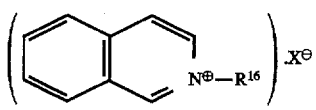

(IX)

wherein $R^{16}$ and X are the same as above.

Among them, the compounds represented by the formulae (III), (IV) and (VI) are preferable.

Examples of the formulae (I) and (II) are organic amine compounds such as methylamine, dimethylamine, trimethylamine, ethylamine, diethylamine, triethylamine, butylamine, dimethyldodecylamine, ethylenediamine and N,N,N',N'-tetramethyltrimethylenediamine; and organic phosphorus compounds such as ethylphosphine, dimethylphosphine, diethylphosphine, trimethylphosphine and triethylphoshine. Examples of the formulae (III) and (IV) are quaternary ammonium compounds such as tetramethylammonium hydroxide, tetrabutylammonium fluoride, vinyltrimethylammonium hydroxide, tetraheptylammonium chloride, tetrabutylammonium stearate, tetramethylammonium chloride, distearyldimethylammonium chloride, methyltrioctylammonium oxalate, benzyltrioctylammonium chloride, trimethylbenzylammonium chloride, triethylbenzylammonium chloride, dimethyldodecylbenzylammonium chloride, triethylbenzylammonium bromide, myristylbenzyldimethylammonium chloride, dodecyltrimethylammonium chloride, coconuttrimethylammonium chloride, cetyltrimethylammonium chloride, stearyltrimethylammonium chloride, distearyldimethylammonium chloride, N-methyltriethanolammonium chloride, tetrabutylammonium hydroxide, 1,4-phenylenedimethylene-bistrimethylammonium dichloride and 1,4-phenylenedimethylene-bistriethylammonium dichloride; and quaternary phosphonium compounds such as tetrabutylphosphonium bromide, tetrabutylphosphonium iodide, tetramethylphosphonium acetate, tetrabutylphosphonium hydroxide and triphenylbenzylphosphonium bromide. Examples of the formula (VI) are quaternary ammonium compounds such as 8-methyl-1,8-diazabicyclo(5.4.0)-7-undecenium chloride, 8-methyl-1,8-diazabicyclo(5.4.0)-7-undecenium iodide, 8-methyl-1,8-diazabicyclo(5.4.0)-7-undecenium hydroxide, 8-methyl-1,8-diazabicyclo(5.4.0)-7-undecenium-methyl sulfate, 8-ethyl-1,8-diazabicyclo(5.4.0)-7-undecenium bromide, 8-propyl-1,8-diazabicyclo(5.4.0)-7-undecenium bromide, 8-dodecyl-1,8-diazabicyclo(5.4.0)-7-undecenium chloride, 8-dodecyl-1,8-diazabicyclo(5.4.0)-7-undecenium hydroxide, 8-eicosyl-1,8-diazabicyclo(5.4.0)-7-undecenium chloride, 8-tetracosyl-1,8-diazabicyclo(5.4.0)-7-undecenium chloride, 8-benzyl-1,8-diazabicyclo(5.4.0)-7-undecenium chloride, 8-benzyl-1,8-diazabicyclo(5.4.0)-7-undecenium hydroxide, 8-phenethyl-1,8-diazabicyclo(5.4.0)-7-undecenium chloride and 8-(3-phenylpropyl)-1,8-diazabicyclo(5.4.0)-7-undecenium chloride. Examples of the formula (VII) are quaternary ammonium compounds such as 1,3-dimethyl-2-heptylimidazolium iodide, 1,3-dimethyl-2-nonylimidazolium iodide, 1,3-dimethyl-2-undecylimidazolium iodide, 1,3-dimethyl-2-heptadecylimidazolium chloride, 1-dodecyl-2,3-dimethylimidazolium-p-toluene sulfonate, 1-tetradecyl-2,3-dimethylimidazolium hydroxide, 1-dodecyl-2-undecyl-3-methylimidazolium methyl sulfate and 1-vinyl-2-methyl-3-dodecylimidazolium chloride. Examples of the formula (VIII) are quaternary ammonium compounds such as laurylpyridinium chloride and hexadecylpyridinium chloride. Examples of the formula (IX) are quaternary ammonium compounds such as laurylisoquinolinium chloride.

As the basic solution used in the present invention, there are exemplified an aqueous solution of an inorganic basic compound or a solution of an organic basic compound. Examples of the aqueous solution of the inorganic basic compound are the above-mentioned aqueous solution of $NH_4OH$ and the like. Examples of the solutions of the organic basic compound are aqueous or non-aqueous solutions of the above-mentioned organic amine compound, organic phosphorus compound, quaternary ammonium compound and quaternary phosphonium compound (for example, solution of alcohol such as methanol or ethanol). Also the above-mentioned basic compounds may be used as they are when they are in the form of liquid. Among them, aqueous solutions of the quaternary ammonium compounds and quaternary phosphonium compounds are preferable from points of high basicity and good handling property.

With respect to basicity of the basic solution, it is desirable that a pKb of its aqueous solution is not more than about 5, preferably about 4 to 0.1.

As a treating method, for example, the basic solution is filled in a vessel made of quartz, and the fluorine-containing resin molded article to be treated is completely dipped therein. The vessel is placed on a movable table, and the table is moved while the laser beam is irradiated from the above to modify a desired region on a surface of the fluorine-containing resin molded article.

The surface-modified fluorine-containing resin molded article of the present invention not only has more enhanced adhesion to an adhesive, printing ink and paint but also can obtain good adhesion to metals. Therefore, in producing a fluorine-containing resin printed circuit for high frequency in an electronic industry, metal wiring can be provided directly on the circuit by pattern irradiation of the laser beam to the fluorine-containing resin molded article and then electroless plating of a metal.

The present invention is explained in the following by means of Examples, but is not limited thereto.

Example 1

A PTFE sheet (tradename Polyflon available from Daikin Industries, Ltd.) was placed in a quartz chamber filled with 5% by weight of aqueous solution (pKb: 0.2) of tetramethylammonium hydroxide, and then after the chamber was sealed with a quartz plate, 2,000 pulses of a laser beam having a wavelength of 266 nm were irradiated by using an Nd:YAG laser with an energy of 40 mJ/1 pulse/1.1 $cm^2$.

Figure 2:
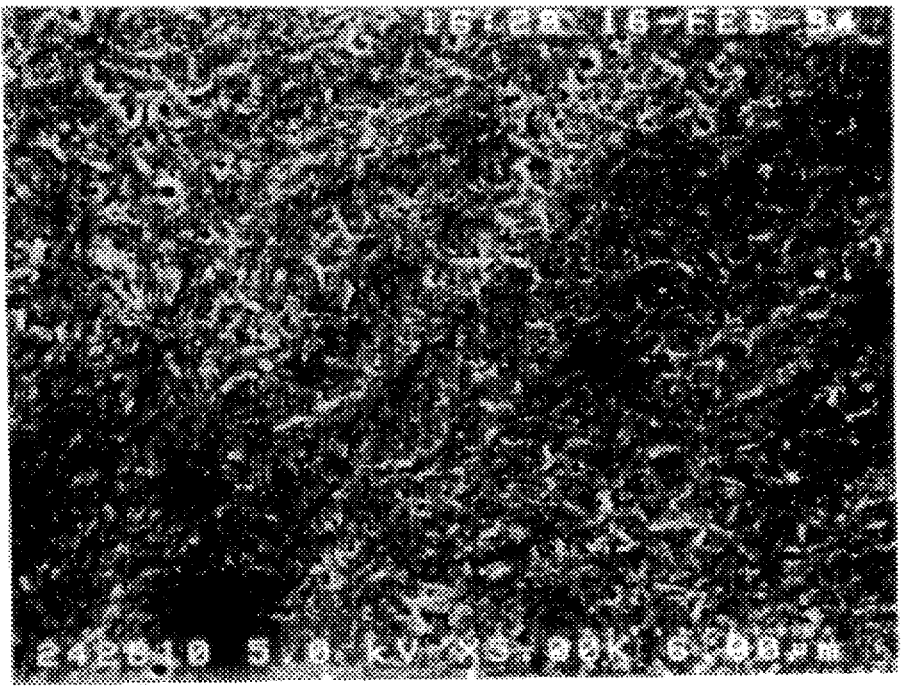
FIG. 2 is a scanning electron microscopic photograph (×5,000) showing a state of a surface of a PTFE sheet after irradiation of a laser beam in Example 2.

Surface condition of the obtained surface-modified PTFE sheet was examined with a scanning type electron microscope (SEM, ×5,000). FIG. 1 is a photograph showing the surface condition before the irradiation of the laser beam, and FIG. 2 is a photograph showing the surface condition after the irradiation of the laser beam. It is seen from those photographs that surface roughness of the surface-modified PTFE sheet (FIG. 2) is enhanced as compared with the untreated sheet (FIG. 1).

Then the surface-modified PTFE sheet was plated with copper through electroless plating method under the following conditions.

The surface-modified PTFE sheet was washed with water, and then activated with an activating solution comprising palladium, tin and hydrochloric acid (0.5 g/liter of palladium, 12 g/liter of tin, 160 g/liter of 36% hydrochloric acid). Then the sheet was washed with water and dipped at 70° C. for 90 minutes in an electroless plating solution of copper having pH of about 12 ($CuSO_4 \cdot 5H_2O$: 12 g/liter, 37% formalin: 6 ml/liter, NaOH: 12 g/liter, EDTA (2 Na): 35 g/liter) to carry out electroless copper plating.

Copper adhered to the whole surface of the copper plated PTFE sheet. The sheet was then subjected to ultrasonic cleaning in water at room temperature for one minute. Copper on the surface where the laser beam was not irradiated was easily peeled off, but the surface irradiated with the laser beam was not peeled off.

Furthermore, when the through hole was formed on the copper-plated PTFE sheet, there occurred no crack on the copper plating layer.

Example 2

A surface of a PTFE sheet was modified in the same manner as in Example 1 except that 2,000 pulses of a laser beam was irradiated with an energy of 35 mJ/1 pulse/1.05 cm$^2$.

To examine hydrophilic property of the surface-modified PTFE sheet, a contact angle with water was measured. The measured advancing contact angle and receding contact angle were 80° and 35°, respectively, which showed the fact that the hydrophilic property of the sheet was enhanced.

In measurement of the contact angle, a water droplet of 1.5 mm in diameter was made with a microsyringe and was brought into contact with a surface of the surface-modified PTFE sheet to transfer the water droplet on the surface of the PTFE sheet. Then the sheet was inclined slowly, and the contact angles at the side of an advancing direction and a receding direction of water droplet were measured as an advancing contact angle and a receding contact angle, respectively, when the water droplet begins to slide.

Example 3

A sheet surface-modified under the same conditions as in Example 1 was subjected to electroless nickel plating under the following conditions.

nickel having pH of about 5 (Nickel chloride: 30 g/liter, acetic acid: 30 g/liter, sodium hypophosphite: 10 g/liter, ammonium acetate: 38.8 g/liter) to carry out electroless nickel plating.

Nickel adhered to the whole surface of the nickel plated PTFE sheet. The sheet was then subjected to ultrasonic cleaning in water at room temperature for one minute. Nickel on the surface where the laser beam was not irradiated was easily peeled off, but the surface irradiated with the laser beam was not peeled off.

Example 4

An ETFE sheet (Thickness: 100 μm) (tradename Neoflon ETFE available from Daikin Industries, Ltd.) was placed in a quartz chamber filled with 5% by weight of aqueous solution (pKb: 0.2) of tetramethylammonium hydroxide, and then after the chamber was sealed with a quartz plate, 2,000 pulses of a laser beam having a wavelength of 266 nm were irradiated by using an Nd:YAG laser with an energy of 41 mJ/1 pulse/1.2 cm$^2$.

Contact angles with water on the surface of the irradiated portion of the sheet were measured in the same manner as in Example 2. An advancing contact angle and a receding contact angle were 81° and 43°, respectively.

Example 5

A PTFE sheet was surface-modified in the same manner as in Example 1 except that basic solutions shown in Table 1 were used. The obtained surface-modified PTFE sheet was subjected to electroless copper plating in the same manner as in Example 1, and adhesion of the copper plating layer was examined in the same manner as in Example 1. The results are shown in Table 1.

TABLE 1

| | Aqueous basic solution | | Peeling off of copper plating layer by ultrasonic cleaning | Cracking on copper plating layer when through hole was formed |
|---|---|---|---|---|
| Experiment No. 5-1 | (CH$_3$)NH$_3$OH | (pKb3.4) | No peeling off occurred on irradiated portion. | Very slight crack occurred. |
| Experiment No. 5-2 | (CH$_3$)$_2$NH$_2$OH | (pKb3.3) | No peeling off occurred on irradiated portion. | Very slight crack occurred. |
| Experiment No. 5-3 | (CH$_3$)$_3$NHOH | (pKb4.3) | No peeling off occurred on irradiated portion. | Slight crack occurred. |
| Experiment No. 5-4 | (C$_2$H$_5$)$_3$NHOH | (pKb3.3) | No peeling off occurred on irradiated portion. | Very slight crack occurred. |
| Experiment No. 5-5 | Aqueous ammonia | (pKb4.8) | No peeling off occurred on irradiated portion. | Slight crack occurred. |
| Experiment No. 5-6 | (C$_4$H$_9$)$_4$NF | (—) | No peeling off occurred on irradiated portion. | No crack occurred. |
| Experiment No. 5-7 | (C$_4$H$_9$)$_4$POH | (—) | No peeling off occurred on irradiated portion. | No crack occurred. |
| Experiment No. 5-8 | 8-Benzyl-1,8-diazabicyclo(5.4.0)-7-undecenium chloride | (—) | No peeling off occurred on irradiated portion. | No crack occurred. |

The surface-modified PTFE sheet was washed with water, and then activated with an activating solution comprising palladium, tin and hydrochloric acid (0.5 g/liter of palladium, 12 g/liter of tin, 160 g/liter of 36% hydrochloric acid). Then the sheet was washed with water and dipped at 70° C. for 90 minutes in an electroless plating solution of Example 6

A PTFE sheet was surface-modified in the same manner as in Example 1 except that a laser beam generated with a laser shown in Table 2 and having a wavelength shown in the same table was used.

The obtained surface-modified PTFE sheet was subjected to electroless copper plating in the same manner as in Example 1, and adhesion of the copper plating layer was examined in the same manner as in Example 1. The results are shown in Table 2.

TABLE 2

| | Laser beam | | Peeling off of copper plating layer by ultrasonic cleaning |
|---|---|---|---|
| | Laser | Wavelength (nm) | |
| Experiment No. 6-1 | Excimer laser (ArF) | 193 | No peeling off occurred on irradiated portion. |
| Experiment No. 6-2 | Nd-YAGX 1/3 | 355 | No peeling off occurred on irradiated portion. |

Comparative Examples 1 and 2

A surface of a PTFE sheet was modified in the same manner as in Example 1 except that a laser beam was irradiated in an atmosphere shown in Table 3 but not through a basic solution.

The obtained PTFE sheet was subjected to electroless copper plating under the same conditions as in Example 1. There occurred peeling off of copper easily or partially by the ultrasonic cleaning even on the surface irradiated with the laser beam.

Comparative Example 3

After a PTFE sheet was put in a vacuum chamber made of quartz and the chamber was evacuated, ammonia gas was introduced until the pressure reaches 500 mmHg. Then a laser beam was irradiated in the same manner as in Example 1. The resulting PTFE sheet was subjected to electroless copper plating in the same manner as in Example 1. Copper even on the irradiated portion was peeled off easily by the ultrasonic cleaning.

TABLE 3

| | Atmosphere | Peeling off of copper plating layer by ultrasonic cleaning |
|---|---|---|
| Com. Ex. 1 | Pure water | Peeling off occurred easily. |
| Com. Ex. 2 | Aqueous solution of boric acid (5% by weight) | Peeling off occurred easily. |

INDUSTRIAL APPLICABILITY

According to the present invention, not only enhancement of adhesion to organic materials but also provision of adhesion to metals, which could not be obtained hitherto by laser beam irradiation, can be made.

We claim:

1. A surface-modified fluorine-containing resin molded article obtained by irradiation of a laser beam having a wavelength of 150 to 370 nm through a basic solution onto a surface of a fluorine-containing resin molded article.

2. The surface-modified fluorine-containing resin molded article of claim 1, wherein said basic solution is an aqueous basic solution.

3. The surface-modified fluorine-containing resin molded article of claim 2, wherein a pKb of said aqueous basic solution is not more than 5.

4. The surface-modified fluorine-containing resin molded article of claim 2, wherein a pKb of said aqueous basic solution is from 4 to 0.1.

5. The surface-modified fluorine-containing resin molded article of claim 2, wherein said aqueous basic solution is an aqueous solution of a quaternary phosphonium compound or quaternary ammonium compound represented by the formula:

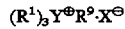

$$(R^1)_3Y^{\oplus}R^9 \cdot X^{\ominus}$$

wherein $R^1$ is an alkyl group having 1 to 20 carbon atoms, $R^9$ is an alkyl group having 1 to 20 carbon atoms or an aralkyl group having 7 to 20 carbon atoms, X is an anion such as halide, hydroxylate, alkoxylate, carboxylate, phenoxide, sulfonate, sulfate, sulfite or carbonate, Y is nitrogen atom or phosphorum atom; a quaternary ammonium compound represented by the formula:

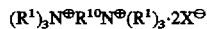

$$(R^1)_3N^{\oplus}R^{10}N^{\oplus}(R^1)_3 \cdot 2X^{\ominus}$$

wherein $R^1$ and X are the same as above, $R^{10}$ is an alkylene group having 1 to 21 carbon atoms or a phenylenedialkylene group having 8 to 12 carbon atoms; or a quaternary ammonium compound represented by the formula:

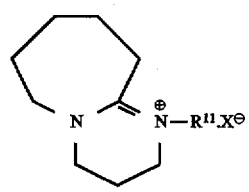

wherein X is the same as above, $R^{11}$ is an alkyl group having 1 to 24 carbon atoms or an aralkyl group having 7 to 20 carbon atoms.

* * * * *